United States Patent [19]

Skodlar

[11] Patent Number: 5,734,370
[45] Date of Patent: Mar. 31, 1998

[54] COMPUTER CONTROL DEVICE

[76] Inventor: Rafael Skodlar, 206 E. Arbor Ave., #2, Sunnyvale, Calif. 94086

[21] Appl. No.: 387,177

[22] Filed: Feb. 13, 1995

[51] Int. Cl.[6] ................................................. G09G 5/00
[52] U.S. Cl. .......................... 345/156; 345/160; 345/145; 463/38; 341/20; 341/21
[58] Field of Search ............................... 345/156, 160, 345/145; 463/38; 341/20, 21; G09G 5/00

[56] References Cited

U.S. PATENT DOCUMENTS

| | | | |
|---|---|---|---|
| 3,770,915 | 11/1973 | Bennett et al. | 200/6 |
| 4,659,313 | 4/1987 | Kuster | 434/45 |
| 4,748,441 | 5/1988 | Brzezinski | 340/709 |
| 4,812,829 | 3/1989 | Ebina et al. | 340/709 |
| 4,924,216 | 5/1990 | Leung | 340/709 |
| 5,160,918 | 11/1992 | Saposnik | 340/709 |
| 5,296,846 | 3/1994 | Ledley | 345/161 |
| 5,396,266 | 3/1995 | Brimhall | 345/161 |
| 5,551,701 | 9/1996 | Bouton | 345/168 |

*Primary Examiner*—John K. Peng
*Assistant Examiner*—Vivek Srivastava
*Attorney, Agent, or Firm*—Paul F. Schenck

[57] ABSTRACT

A universal computer control device for controlling an image on an image display device has a group of basic control signal input means for manipulating a displayed image and for relating the displayed image to the control device and optional control signals for controlling microhandlers and for simulating operation of various different devices such as aircraft, cars, bikes and sport equipment.

21 Claims, 6 Drawing Sheets

COMPUTER CONTROL DEVICE

FIELD OF THE INVENTION

This invention relates to computer control and input devices where computer action is determined by the position or motion of the member of the control device.

BACKGROUND OF THE INVENTION

Many computer action games such as flight simulators are played with a joystick control devices of one type or another. Joystick control devices traditionally have a vertical stick with X and Y sensors for defining a position in a horizontal plane. In one version, the stick is pivotally mounted i.e. it has a fixed position at one end and it is freely movable at the other. Therefore, the stick can be moved in a radial direction at one end only. In another version, a stick has a "fixed" point in the center of the mechanism so that one side is used as a handle for hand while the other is moving parts of the sensor. Joystick control devices mentioned above don't provide any means for a longitudinal movement of the control stick and sensing thereof when such control would be desired.

SUMMARY OF THE INVENTION

It is an object of this invention to provide a computer control apparatus for use with computer controlled devices, electronic games and a like. Of the large number of applications three are discussed in detail. A mechanism is provided for a control stick to be movable in radial as well as longitudinal direction. This apparatus provides means for more real billiard game simulation programs and a like. When apparatus is modified with a bow attachment it can be used as archery simulator. Yet another option provides computer control where the rotation of the stick together with other movements is desirable. Such apparatus could be used to control surgical manipulators in surgery and diagnostics, or with remotely controlled devices to help disabled persons. Parts or complete robots could be manipulated in industrial and military environments with this control apparatus.

It is another object of the invention to provide for a general purpose control stick mechanism which can be used in various position and in combination with springs and locking mechanism to establish preferred quiescent states. Various electrical and electronic elements attached to or included in the mechanism provide for a large variety of different control signals relating to the manipulation of the control stick and the speed with which the control stick is operated.

DETAILED DESCRIPTION OF THE INVENTION

In accordance with this invention, a mechanism is provided where sensors convert the position and movement of the control stick into control signals for use in computer program control. The preferred embodiment of the invention comprises a mechanism with sensors for two pivotal movement, preferably with horizontal and vertical orientation of the axes, of the control stick, and sensors for the longitudinal and rotational movement of the control stick. By rotating the control apparatus these two axes may both become horizontally oriented. It is considered within the scope of the present invention to use axes which are not normal to each other.

Figure 1:
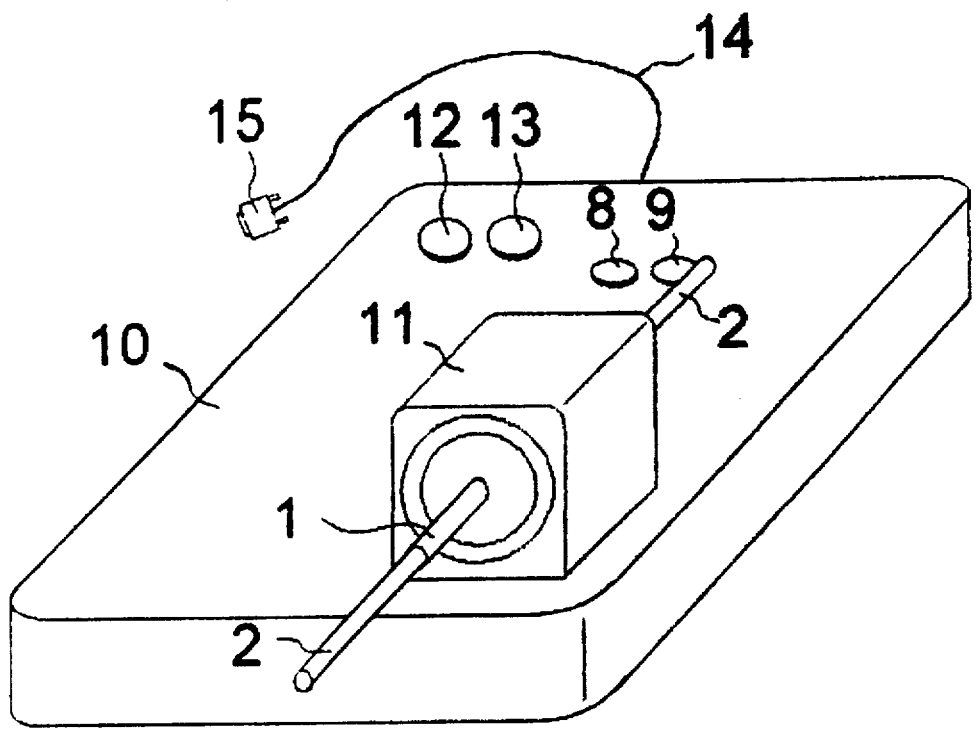
FIG. 1 is an illustration of a perspective view of control apparatus.

Referring to FIG. 1 an illustration of preferred embodiment of the invention is shown. Base 10 contains electronic circuit board with electronic components, provides support for the control stick mechanism in enclosure 11 and provides a resting surface for the users hand. Cable 14 connects control stick apparatus to the personal computer game port or electronic game device with connector 15. Control input devices 12 and 13 provide control of players virtual position around the virtual pool table. Control input device 12 causes virtual movement to the left while control input device 13 causes virtual movement to the right. Control input devices 8 and 9 provide virtual vertical movement, i.e. the virtual height of the control stick 2 above the rim of the pool table. Control stick 2 is freely movable inside the guide tube 1.

FIG. 2a through FIG. 2f are illustrations of electromagnetic position detectors and 3 different types of control sticks with 2 respective cross sections. Control sticks are made of nonmagnetic material and have permanent magnetic rings or segments embedded in them. Another design choice calls for a magnetic coating used in place of permanent magnetic rings or segments. A pattern, similar to a magnetic field created by already described permanent magnetic elements, would need to be recorded on a such coating. Recording could be done in any mathematically formulated pattern. For example, a Gray code pattern would provide information for direction of the rotation and absolute position of the control stick at the same time. It the above disclosure the use of multiple magnetic patterns were discussed including recording of data in such pattern. Alternatively one could use physical characteristics in context of similar marking to identify the position of that stick relative to the reference point which is represented by the intersection of the two axes 25 and 26 defining the angular movement of stick 2.

Figure 2A:
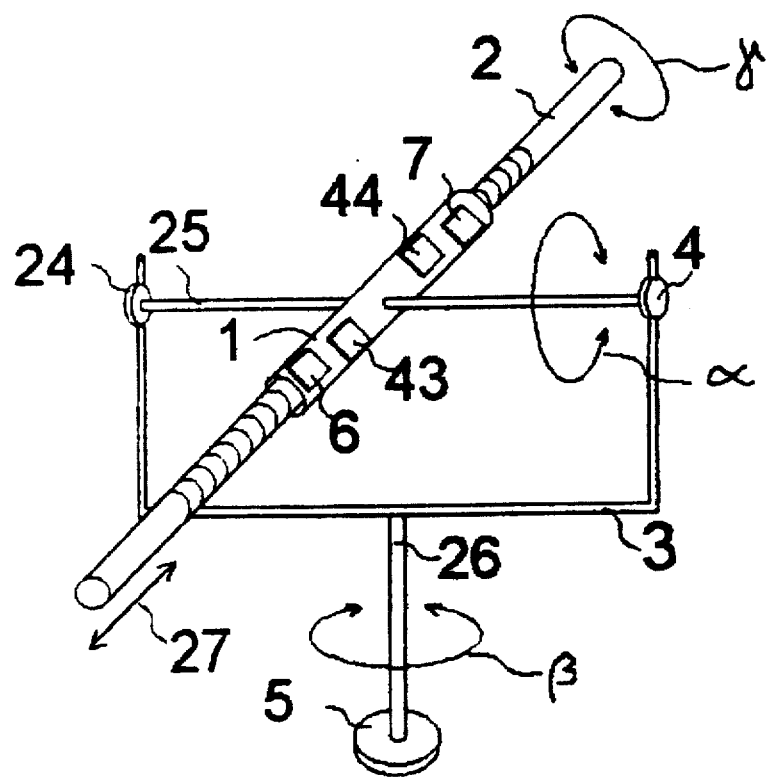
FIG. 2a is a schematic illustration of the main mechanical and electronic components.

FIG. 2a is an illustration of electromagnetic sensors and position detectors. Control stick 2 is inserted into guide tube 1 which has sensor means 4, 5, 6, 7, and optional sensor means 43 and 44. Guide tube 1 is mounted between 2 sections forming axis 25 which is suspended between sensor means 4 and bearing 24. Sensor means 4 detects movements of guide tube 1 when pivoted around axis 25, shown as a rotation $\alpha$. If mounting of the guide tube 1 on the side of axis 25 is desired, the software may need to compensate for the offset. Sensor means 5 registers movements of support means 3 in a plane normal to axis 26, shown as a rotation $\beta$. Magnetic field sensitive side of sensor means 6 and 7 face towards inside of guide tube 1 to detect any movement of control stick 2 or other version of control stick. This arrangement provides for interchangeability of different types of control sticks. Sensor means 6 detect longitudinal movements (direction 27) of control stick 2 while sensor means 7 detect the rotation $\gamma$ of control stick 2. Control input devices 12 and 13 or 8 and 9 or any combination thereof are used to select the direction of the motion or the rotation of the control stick 2. A single sided support for guide tube 1 could be used, thus eliminating bearing 24 in another implementation of support means 3. The intersection of axis 25 and axis 26 for the rotation of control stick 2 of the whole arrangement provides the reference point of the linear movement of control stick 2.

Figure 2B:
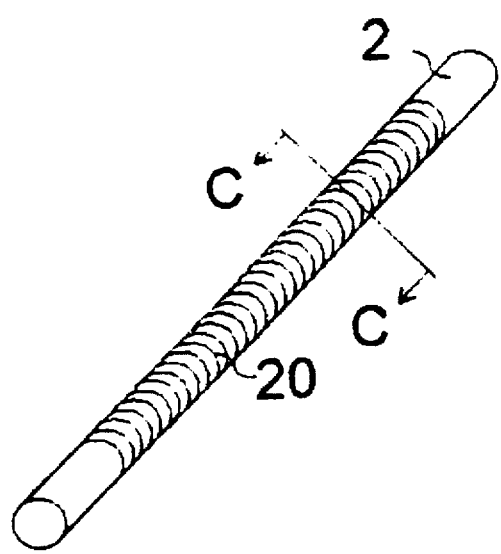
FIG. 2b is a detailed illustration of the first type of the control stick—control cue.
Figure 2C:
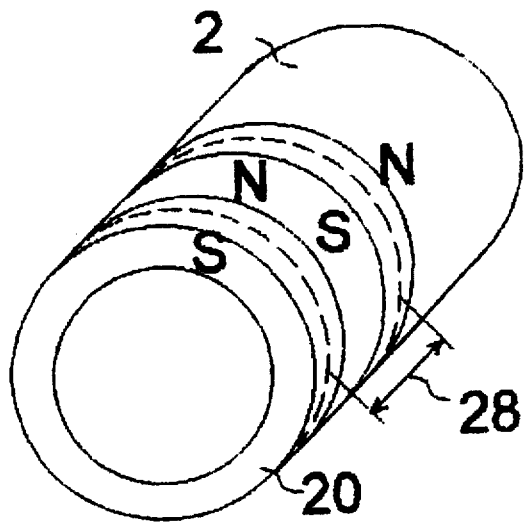
FIG. 2c is a cross section of the control cue.

Control stick 2 with embedded magnetic rings 20 is shown on FIG. 2b with the respective cross section C—C on FIG. 2c. Polarization of magnetic rings 20 is running longitudinally as shown on FIG. 2c. Item 28 designates the distance between center lines 29 of two adjacent magnetic rings 20.

Figure 2D:
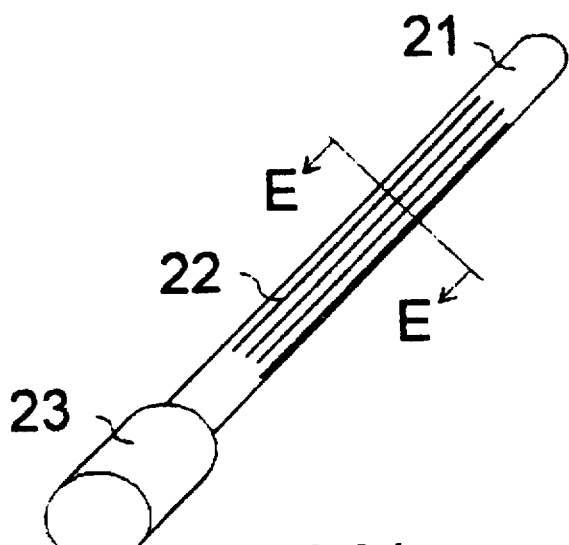
FIG. 2d is a detailed illustration of the second type of the control stick.
Figure 2E:
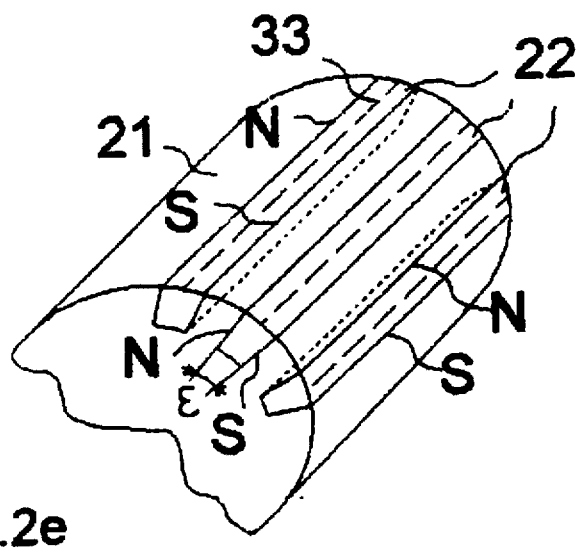
FIG. 2e is a cross section of the second type of the control stick.

Alternative control stick 21 is shown on FIG. 2d. Magnetic segments 22 are embedded into nonmagnetic material and polarized as shown on FIG. 2e. Control apparatus detects the rotation of control stick 21 with sensor means 6 and 7 together with the angular $\alpha$ and $\beta$ movements, FIG. 2a. Control knob 23 prevents moving the control stick too far into guide tube 2. Longitudinal movement shown as item 27 on FIG. 2a would not be detected.

Figure 2F:
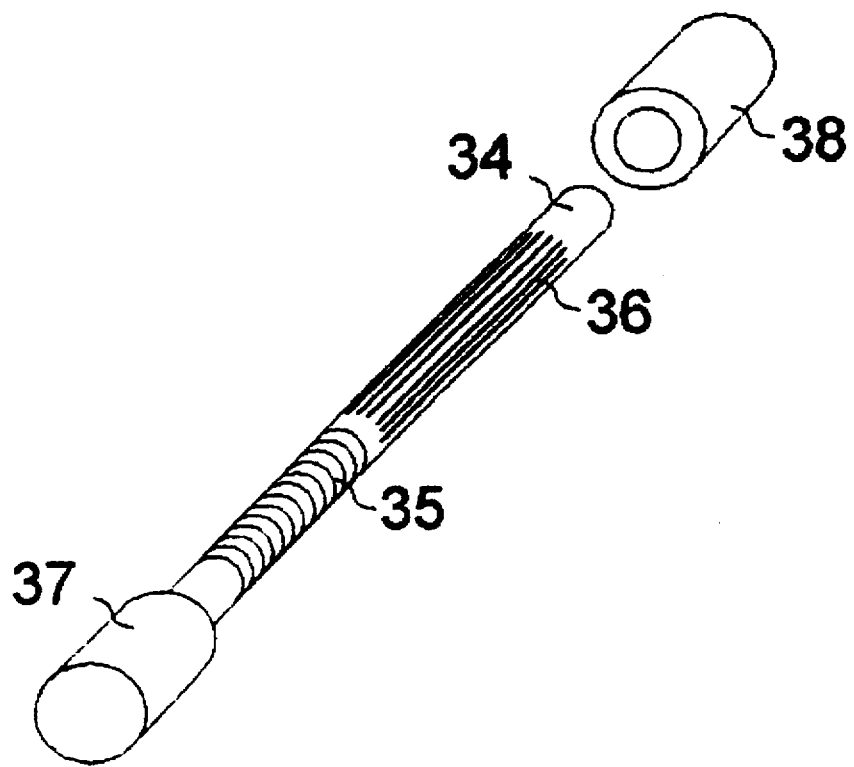
FIG. 2f shows the third type of the control stick, a combination of the previous two.

A combination of control stick 2 and control stick 21 makes control stick 34, shown on FIG. 2f. One section of control stick 34 has magnetic rings 35 while the other section has magnetic segments 36. Polarizations of magnetic elements are similar to their equivalents described in above paragraphs.

To detect the direction of the movement automatically, optional sensors 43 and 44 are used. They are mounted in a similar fashion as sensor means 6 and 7. Control knob 37 and removable cap 38 limit movement of control stick 34 in longitudinal direction. That prevents a sudden switch between respective functions of sensor means 6 and 7 or optional sensor means 43 and 44.

Figure 3:
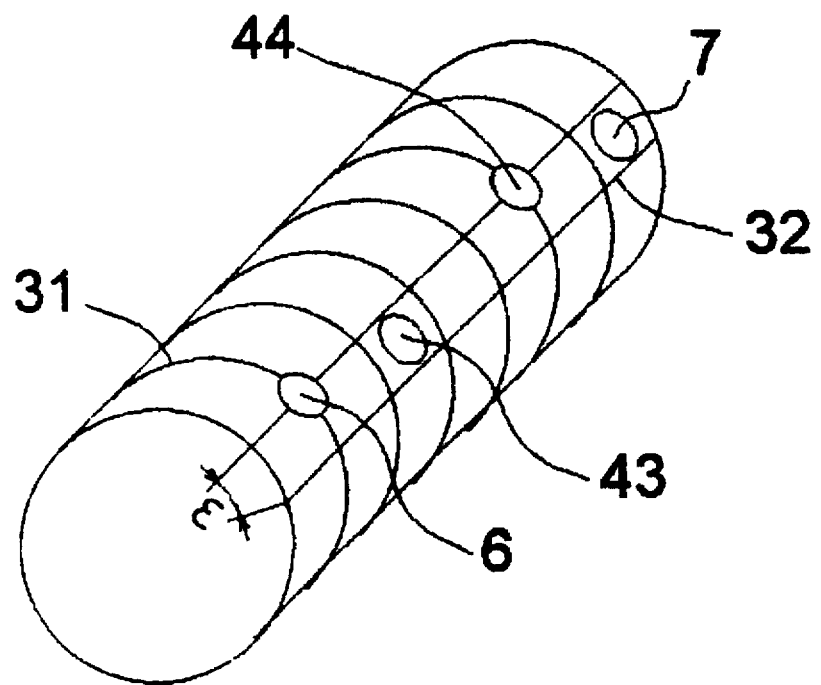
FIG. 3 is a diagram of major electronic components, their interconnections and sections of control cue passing magnetic sensors.

FIG. 3 is an illustration of position of sensor means 6, 7, 43, and 44 on guide tube 1. Circumferential lines 31 are spaced the same distance (item 28, FIG. 2c) as center lines 29 of magnetic rings 20 on control stick 2. Longitudinal lines 32 are spaced the same arc distance ($\epsilon$) as N and S edges of magnetic segments 22 of control stick 21 (see FIG. 2e). Sensor means 6 and 7 are spaced in multiples of distance 28, shown on FIG. 2c, plus ½ of the thickness of magnetic ring 20. Sensor means 6 and 7 are apart for ½ of an arc distance $\epsilon$ between N and S poles of magnetic segments 22 of the control stick 21. Circuit 40 (FIG. 4a) would thus automatically detect rotation $\gamma$ and the direction (see FIG. 2a) of control stick 21.

Figure 4A:
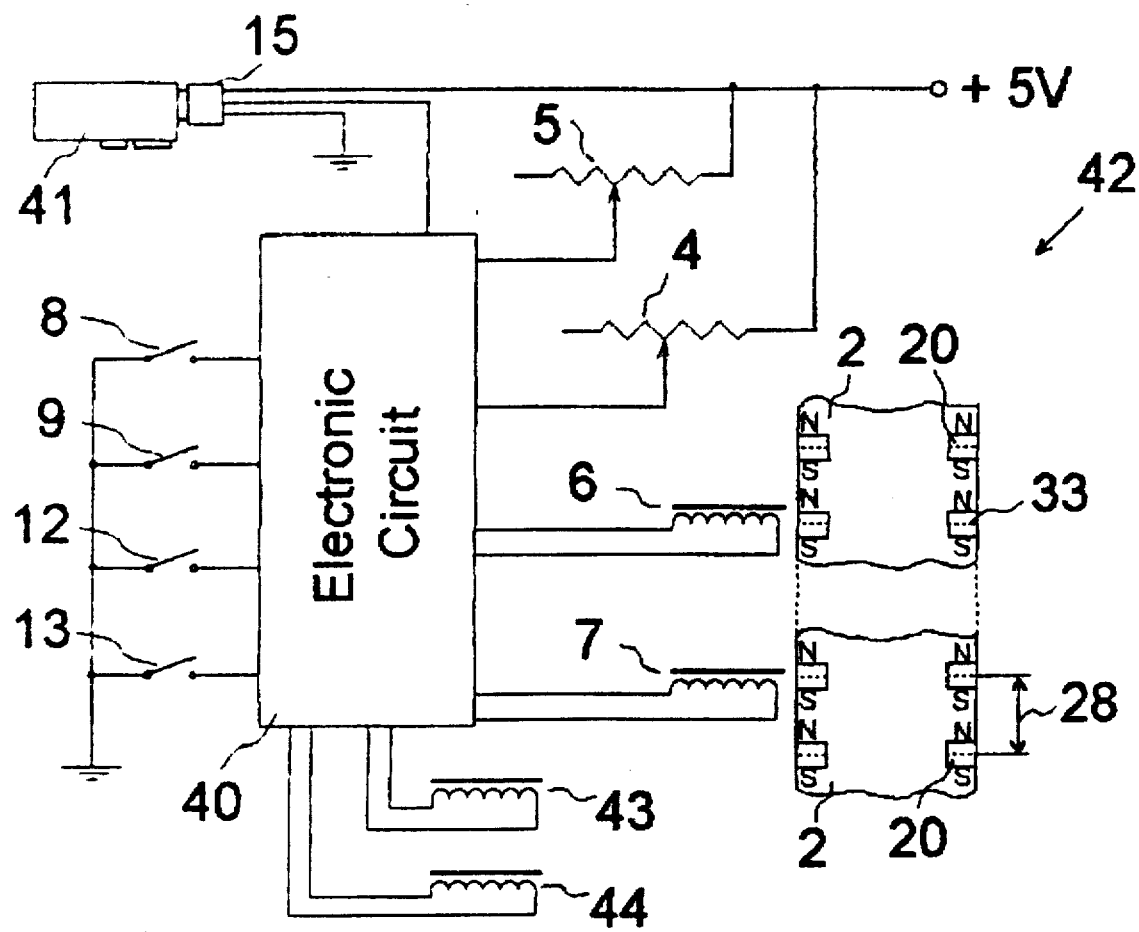
FIG. 4a is a an illustration of the arrangement of magnetic sensors and their connections to the electronic circuit, and the arrangement of magnetic elements along part of the extension of the control stick.

FIG. 4a is electronic diagram of control apparatus 42 with sensor means 4 (rotation $\alpha$), 5 (rotation $\beta$), 6, and 7 connected to electronic circuit 40. In the illustrated implementation of the present invention sensor means 4 and 5 are variable resistors while sensor means 6 and 7 are magnetic pickups. When a control stick 2 moves in direction 27 shown on FIG. 2a, magnetic rings 20 cause change of the magnetic field in proximity of sensor means 6 and 7 thereby generating voltages which are amplified and converted to digital pulses in electronic circuit 40 of FIG. 4a. Signals from the circuit 40 are feed to computer interface 41 via cable 14. Control and sense information can be transmitted to the computer or other device using infrared or other communication means.

Figure 4B:
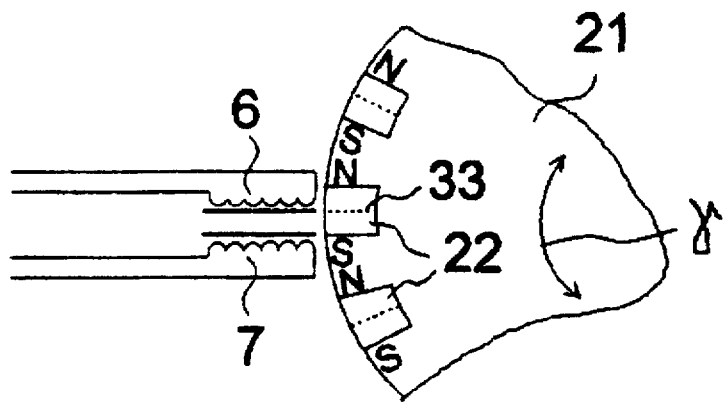
FIG. 4b shows two magnetic sensors in operative proximity of magnetic elements which are arranged circumferentially around a section of the control stick.

FIG. 4b is a section of the FIG. 4a where control stick 2 is replaced with a control stick 21. Sensor means 6 and 7 are separated ½ of the arc distance $\epsilon$ between the poles of magnetic segment 22. Moving magnetic segments 22 causes sensor means 6 and 7 to generate positive and negative voltage pulses respectively when passing N and S magnetic poles of magnetic segments 22, therefore provide means for automatic detection of the direction of the rotation.

Figure 5:
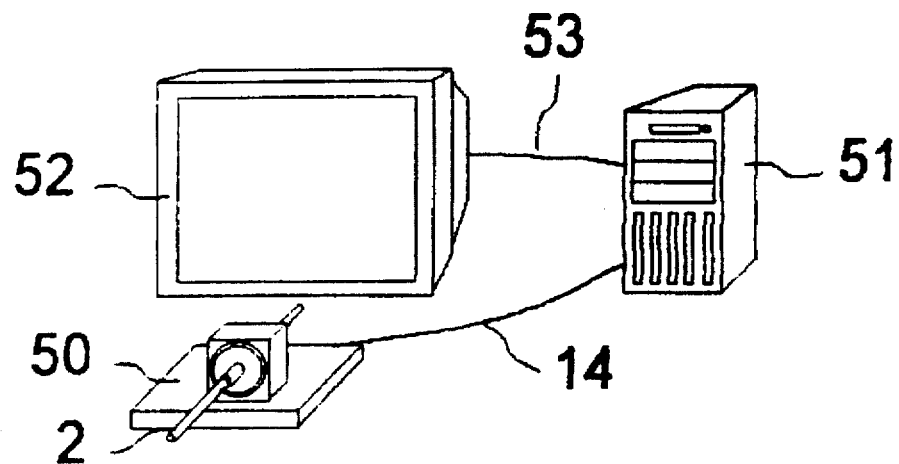
FIG. 5 is a view of a computer control device in front of the computer monitor connected to the personal computer.

FIG. 5 is an illustration of a preferable game arrangement of control apparatus 50 and monitor 52. Computer 51 is shown as a separate unit, connected with cable 14 to control apparatus 50 and with cable 53 to monitor 52.

Figure 6:
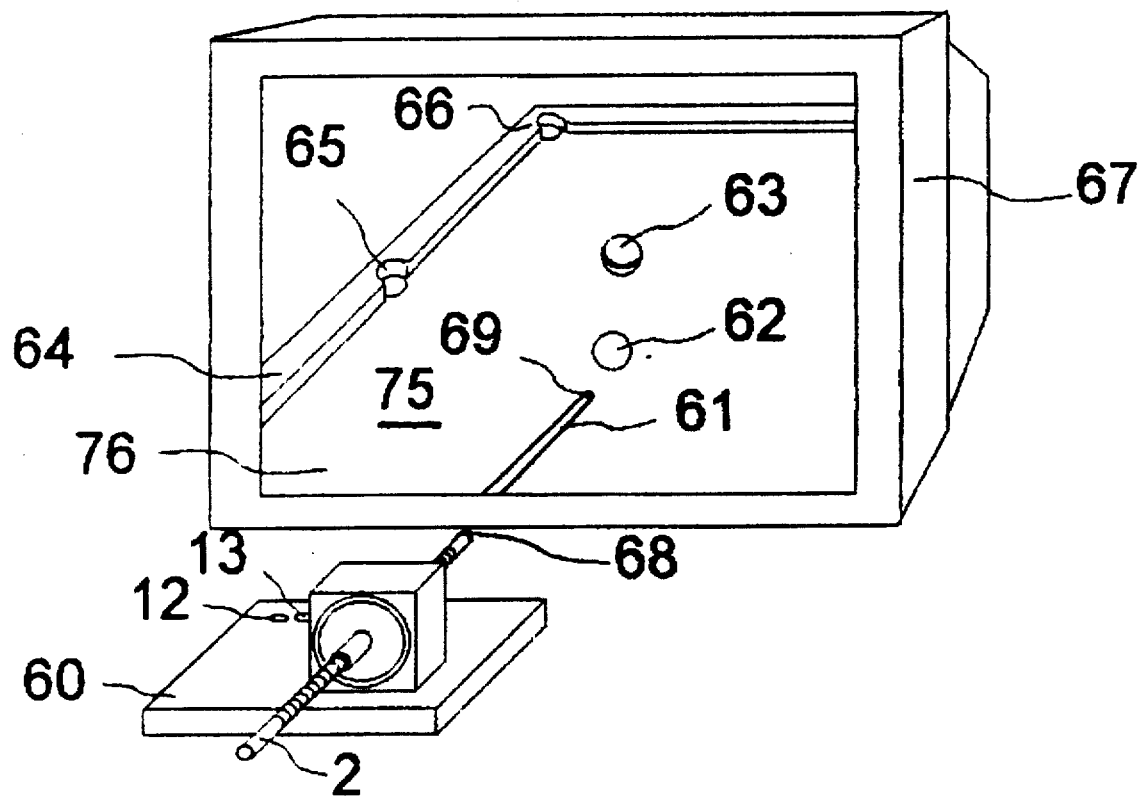
FIG. 6 is a perspective view of the computer control device in front of the computer monitor with a simulated image of a billiard table, billiard ball, cue ball, and a virtual cue.

FIG. 6 is an illustration of a billiard game application of control apparatus 60 in combination with computer monitor 67. Monitor screen 75 shows virtual cue 61 with virtual cue tip 69, as virtual extension of control stick 2, billiard balls 62 and 63, billiard table rim 64 with pockets 65 and 66. Normally, the control apparatus 60 is put in the middle between left and right sides of monitor 67. A player looks at screen 75 and observes virtual cue 61 moving in accordance with movement of control stick 2. The virtual height of the virtual cue 61 above virtual billiard table 76 is adjusted by actuating control input devices 8 and 9 (see FIG. 1) for up or down, while the virtual left and right movement of the player around the virtual billiard table 76 is controlled by control input devices 12 and 13 (see FIG. 1).

When control stick 2 on FIG. 6 is equipped with optical sensor 68 at the tip pointing to monitor screen 75, a feedback of control stick 2 provides exact pointing direction. Optical sensor 68 is connected to electronic circuit 40 providing a signal relating to the cursor, virtual cue tip 69 of virtual cue 61 on the screen, thereby allowing to align the displayed image including a virtual image of control cue 61 with control apparatus 60.

Figure 7:
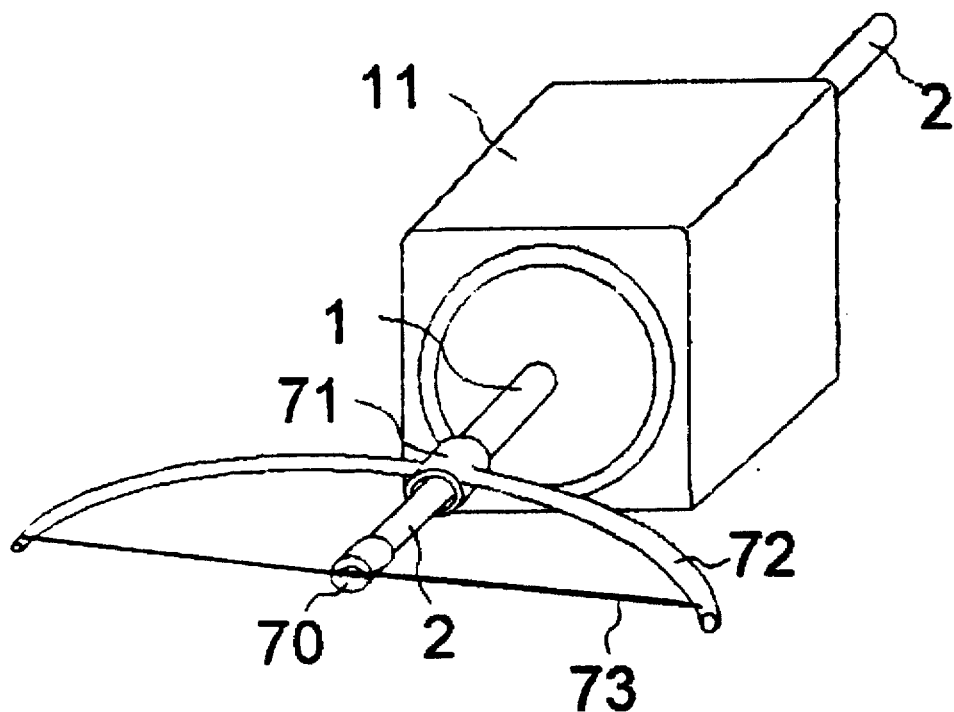
FIG. 7 is an illustration of a control apparatus adaptor for use in archery simulation.

FIG. 7 is an illustration of a section of a modified version of control apparatus 60 of the present invention for use in virtual archery application. An attachment made of plastic sleeve 71 with bow 72, and string 73 is mounted on guide tube 1 of control apparatus 60. Plastic cap 70 is mounted and locked at the end of control stick 2. The diameter of cap 70 is larger than inner diameter of plastic sleeve 71 so that control stick 2 can not fly out of guide tube 1 when it's pulled back by the operator hand and released. When plastic sleeve 71 accommodates a trigger and control stick 2 has a notch in it, apparatus 60 provides means for a virtual crossbow application.

Figure 8:
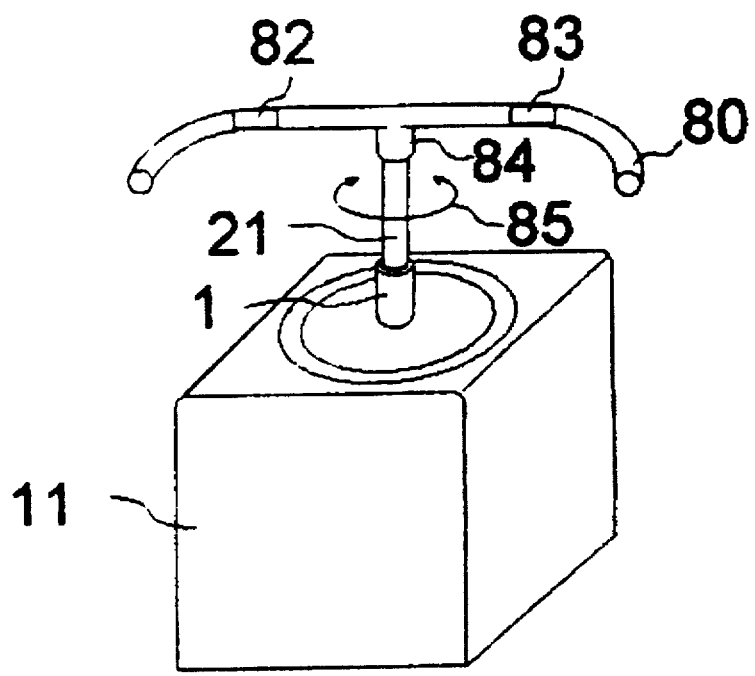
FIG. 8 is an illustration of a control apparatus used as a bike or motor bike controller.

FIG. 8 is an illustration of a control apparatus mechanism 11 positioned for bike or motor bike simulated riding applications. Handle bars 80 are mounted on control stick 81 which is inserted into guide tube 1. Control stick 81 is similar to control stick 21 (FIG. 2d) and turns around vertical axis, item 84. Additional control input means 82 and 83 for gas, clutch, and shift gear simulation are mounted on handle bars 80. In this application the actual control stick mechanism is turned so that control stick 81 extends through the top surface of mechanism 11. Control stick 81 can be forced into an upper position by a spring, thereby allowing to make use of a forced downward push to operate additional signal generating means for actuating or controlling additional functions. Such additional functions could initiate scale changes of the display. Other springs can be attached to force stick 81 into preferred positions when not operated.

Wireless connections between control apparatus and computer could also include wireless connections between subcontroller, such as a handle with additional control devices, which is attached to control stick 2, and electronic circuit 40 in FIG. 45. Additional cable or wireless connections could also be implemented between circuit 40 and input devices controlled by foot or other means.

It is considered to be within the scope of the artisan skilled in the art to replace described sensor means 6, 7, 43, and 44 with Hall effect generators, magnetic field sensors, photosensors, contacts, or other. For example, a control apparatus with photosensors would require either a control stick with a pattern printed or otherwise applied on the surface of a control stick or transparent control stick with nontransparent sections. In another example, a ball sensor detects linear and rotational movements of control stick 2 providing 2 independent signals representing the movements.

It is also considered that an attachment resembling a gun or underwater gun could be mounted in place of bow and arrow for hunting or target practicing simulation. A trigger mechanism with sensor would be mounted on the control stick and connected with a flexible cable or other means to the electronic circuit.

Physical connection between the control apparatus and computer could be replaced with infrared light or radio connection. A lock mechanism could be added to prevent the control stick to move in certain directions. Goggles for virtual reality could be used in place of a computer monitor for 3-D simulation. When turning of control stick 21 is not required, non-round guide tube and control stick could be implemented.

The apparatus of the present invention provides a large variety of signals representative of movement and rate of movement of the actual control stick. Using the apparatus in different orientations of the various axes of movement allows to simulate quite different operations, such as aircraft control sticks with two angular control movements (fighters) or one angular movement or with linear movement of the control column besides the rotation of the control handles, or motor cycle or car control with the control wheel having an angled or even near vertical rotational axis. Offset control means allow to adjust the displayed image to the location of the control apparatus.

Means sensing an occurrance of an optical event in a displayed image, such as the passage of the cathode ray of a cathode ray display, or an event linked to a scanning operation in other types of displays, or the repetetive display of a pattern in timewise or location defined manner or other predetermined event markers can be used to timewise synchronize the control signals with the displayed image. The output of the means for sensing such an optical event can be used in combination with the position signals and the position offset signals to relate the position of the computer control apparatus to the displayed image and enable a symbolic image of the control apparatus or parts of it in the displayed image.

What I claim is:

1. A control signal input apparatus for a computer providing a plurality of control signals for controlling an image displayed on a video display device comprising a first control device for inputting position control signals including two angular position signals,
    said first control device including a control stick having a longitudinal axis and being moveable around a first axis and a second axis;
    said first axis intersecting said second axis thereby providing a reference point at their intersection;
    said first control device including a first and a second sensor means for determining an angular position of said stick and providing a first signal and a second signal,
    said first and said second signals representing said angular positions relative to said first axis and relative to said second axis;
    said control stick including means for linear movement of said control stick along said longitudinal axis;
a position control means including stick sensor means for determining a linear movement of said control stick along said longitudinal axis relative to said reference point, and a rate of said linear movement and providing a third signal representative for said linear movement and said rate;
a offset position control means providing fourth, fifth, and sixth signals,
    said fourth, fifth, and sixth signals providing off-set control signals to said first, second and third signals;
a display timing control means for inputting a seventh signal providing timing information to said computer, said seventh signal relating said position of said control stick to said image displayed on said video display device;
means for transmitting said first through seventh signal to said computer;
    said computer generating an image on said display and changing said image in accordance with said first through seventh signals.

2. A control signal input apparatus as claimed in claim 1, wherein
said control stick further including means for rotational movement around said longitudinal axis,
said position control means further including control stick rotation sensor means for determining said rotational movement and providing an eighth signal representative for said rotational movement.

3. A control signal input apparatus as claimed in claim 2, wherein said control stick rotation sensor means includes means for determining a rotational direction of said rotational movement of said stick around said longitudinal axis and generating a tenth signal indicative for said rotational direction.

4. A control signal input apparatus as claimed in claim 2, wherein said position control means includes means for determining a direction of said linear movement of said stick along said longitudinal axis and generating an eleventh signal indicative for said direction; and
    wherein said control stick rotation sensor means includes means for determining a rotational direction of said rotational movement of said stick around said longitudinal axis and generating a twelfth signal indicative for said rotational direction.

5. A control signal input apparatus as claimed in claim 2 wherein markers are located circumferentially around said stick in equal spaces, and said control stick rotation sensor means includes two sensors, wherein one of said sensors of said control stick rotation sensor means is located an odd multiple of half of said equal spaces away from the other one of said sensors.

6. A control signal input apparatus as claimed in claim 1, wherein said position control means includes means for determining a direction of said linear movement of said stick along said longitudinal axis and generating a ninth signal indicative for said direction.

7. A control signal input apparatus as claimed in claim 1, wherein said image includes a virtual image of said control stick, and wherein said virtual image is aligned with said control stick.

8. An arrangement as claimed in 1, wherein said image includes a virtual image of said control stick, and wherein said virtual image is aligned with said control stick.

9. A control signal input apparatus for a computer providing a plurality of control signals for controlling an image displayed on a video display device comprising a first control device for inputting position control signals including two angular position signals,
 said first control device including a control stick having a longitudinal axis and being moveable around a first axis and a second axis;
  said first axis intersecting said second axis thereby providing a reference point at their intersection;
 said first control device including a first and a second sensor means for determining an angular position of said stick and providing a first signal and a second signal,
  said first and said second signals representing said angular positions relative to said first axis and relative to said second axis;
 said control stick including means for linear movement of said control stick along said longitudinal axis;
a position control means including stick sensor means for determining a linear movement of said control stick along said longitudinal axis relative to said reference point, and a rate of said linear movement and providing a third signal representative for said linear movement and said rate;
a offset position control means providing fourth, fifth, and sixth signals,
 said fourth, fifth, and sixth signals providing off-set control signals to said first, second and third signals;
a display timing control means for inputting a seventh signal providing timing information to said computer, said seventh signal relating said position of said control stick to said image displayed on said video display device;
means for transmitting said first through seventh signal to said computer;
 said computer generating an image on said display and changing said image in accordance with said first through seventh signals,
wherein said control stick represents an arrow, and said image includes a virtual image of said arrow,
 wherein said virtual image is aligned with said control stick, and
 wherein said control device includes an elastic bow for accelerating said control stick in the direction of said longitudinal axis,
 said control stick including means for limiting travel of said stick in the accelerated direction,
whereby said virtual image of said arrow in said displayed image performs a flight in accordance with the selected direction and said rate of movement of said control stick represented by said third signal.

10. A control signal input apparatus for a computer providing a plurality of control signals for controlling an image displayed on a video display device comprising a first control device for inputting position control signals including two angular position signals,
 said first control device including a control stick having a longitudinal axis and being moveable around a first axis and a second axis;
  said first axis intersecting said second axis thereby providing a reference point at their intersection;
 said first control device including a first and a second sensor means for determining an angular position of said stick and providing a first signal and a second signal,
  said first and said second signals representing said angular positions relative to said first axis and relative to said second axis;
 said control stick including means for linear movement of said control stick along said longitudinal axis;
a position control means including stick sensor means for determining a linear movement of said control stick along said longitudinal axis relative to said reference point, and a rate of said linear movement and providing a third signal representative for said linear movement and said rate;
a offset position control means providing fourth, fifth, and sixth signals,
 said fourth, fifth, and sixth signals providing off-set control signals to said first, second and third signals;
a display timing control means for inputting a seventh signal providing timing information to said computer, said seventh signal relating said position of said control stick to said image displayed on said video display device;
means for transmitting said first through seventh signal to said computer;
 said computer generating an image on said display and changing said image in accordance with said first through seventh signals
wherein markers are located along said stick in equal spaces, wherein said position control sensor means includes two sensors, and
wherein one of said sensors of said position control sensor means is located an odd multiple of half of said equal spaces away from the other one of said sensors.

11. A control signal input apparatus as claimed in claim 1, said control stick further including third control means, wherein said third control means includes fifth sensing means located in said control stick for sensing the occurrence of a predetermined optical event at a location on said video display device pointed to by said control stick,
said third control means generating said seventh signal upon detection of said optical event.

12. A control signal input apparatus as claimed in claim 1, wherein said means for linear movement of said control stick along said longitudinal axis included means for springloading said control stick, thereby providing for said control stick a preferred position.

13. A control signal input apparatus as claimed in claim 1, wherein said first axis is a vertical axis, and said second axis is a horizontal axis.

14. A control signal input apparatus for a computer providing a plurality of control signals for controlling an image displayed on a video display device comprising a first control device for inputting position control signals including two angular position signals, said first control device including a control stick having a longitudinal axis and being moveable around a first axis and a second axis;

said first axis intersecting said second axis thereby providing a reference point at their intersection;

said first control device including a first and a second sensor means for determining an angular position of said stick and providing a first signal and a second signal, said first and said second signals representing said angular positions relative to said first axis and relative to said second axis;

said control stick including means for linear movement of said control stick along said longitudinal axis;

a position control means including stick sensor means for determining a linear movement of said control stick along said longitudinal axis relative to said reference point, and a rate of said linear movement and providing a third signal representative for said linear movement and said rate;

a offset position control means providing fourth, fifth, and sixth signals, said fourth, fifth, and sixth signals providing off-set control signals to said first, second and third signals;

a display timing control means for inputting a seventh signal providing timing information to said computer, said seventh signal relating said position of said control stick to said image displayed on said video display device;

means for transmitting said first through seventh signal to said computer;

said computer generating an image on said display and changing said image in accordance with said first through seventh signals, wherein said first axis is a first horizontal axis, and said second axis is a second horizontal axis.

15. A control signal input apparatus as claimed in claim 14, wherein said means for linear movement of said control stick along said longitudinal axis include means for springloading said control stick in an upper position.

16. A control signal input apparatus as claimed in claim 1, wherein said seventh signal is used for adjusting the displayed image to the position of said control device.

17. A control signal input apparatus as claimed in claim 1, wherein said control signals are transmitted to said computer by wireless communication means.

18. An arrangement for simulating events comprising a computer, a display device connected to said computer for displaying an image, and a control device connected to said computer and including a control stick;

said control device generating control signals for changing said image in accordance with a manipulation of said control stick;

said control device including first signal generating means for providing position signals of said control stick, second signal generating means for providing a offset signals for positioning said image on said display device relative to a position of said control device, and third signal generating means for providing alignment signals for aligning said image on said display device relative to said control device;

said computer generating said image, receiving said position signals, said offset signals and said alignment signals, and modifying said image on said display under control of said position signals, said offset signals and said alignment signals received from said control device.

19. An arrangement for simulating events as claimed in claim 18, wherein said position signals represent an angular position of said control stick relative to a reference position and a linear radial position of said control stick relative to said reference position.

20. An arrangement for simulating events as claimed in claim 19, wherein said offset position signals represent offset values for said reference position thereby establishing a base offset reference position.

21. An arrangement for simulating events as claimed in claim 19, wherein said alignment signals represent position relating signals relating said control device to said image displayed on said display device, and timing signals relating dynamic operations of said control stick to said displayed image.

* * * * *